(12) United States Patent
Horiuchi et al.

(10) Patent No.: US 9,029,041 B2
(45) Date of Patent: May 12, 2015

(54) SOLID OXIDE FUEL CELL

(75) Inventors: Michio Horiuchi, Nagano (JP); Yasue Tokutake, Nagano (JP); Shigeaki Suganuma, Nagano (JP); Jun Yoshiike, Nagano (JP); Fumimasa Katagiri, Nagano (JP)

(73) Assignee: Shinko Electric Industries Co., Ltd., Nagano-shi, Nagano (JP)

( * ) Notice: Subject to any disclaimer, the term of this patent is extended or adjusted under 35 U.S.C. 154(b) by 538 days.

(21) Appl. No.: 11/802,344

(22) Filed: May 22, 2007

(65) Prior Publication Data

US 2008/0187806 A1 Aug. 7, 2008

(30) Foreign Application Priority Data

May 23, 2006 (JP) ................ P.2006-142852

(51) Int. Cl.
*H01M 8/10* (2006.01)
*H01M 8/04* (2006.01)
*H01M 8/24* (2006.01)
*H01M 4/88* (2006.01)
*H01M 4/90* (2006.01)

(52) U.S. Cl.
CPC .......... *H01M 8/2425* (2013.01); *H01M 4/8885* (2013.01); *H01M 4/9016* (2013.01); *H01M 8/247* (2013.01); *Y02E 60/50* (2013.01)

(58) Field of Classification Search
None
See application file for complete search history.

(56) References Cited

U.S. PATENT DOCUMENTS

| | | | | |
|---|---|---|---|---|
| 3,350,229 A | * | 10/1967 | Justi | 429/444 |
| 5,340,664 A | * | 8/1994 | Hartvigsen | 429/20 |
| 5,800,798 A | * | 9/1998 | Ino et al. | 423/654 |
| 6,124,054 A | * | 9/2000 | Gorman et al. | 429/34 |
| 6,361,893 B1 | * | 3/2002 | George et al. | 429/31 |
| 2003/0054222 A1 | * | 3/2003 | Horiuchi et al. | 429/34 |
| 2003/0165727 A1 | * | 9/2003 | Priestnall et al. | 429/34 |
| 2003/0186104 A1 | * | 10/2003 | Horiuchi et al. | 429/34 |
| 2004/0081872 A1 | * | 4/2004 | Herman et al. | 429/26 |
| 2004/0142229 A1 | * | 7/2004 | Herman et al. | 429/40 |
| 2006/0204809 A1 | * | 9/2006 | Horiuchi et al. | 429/26 |

FOREIGN PATENT DOCUMENTS

| | | | | |
|---|---|---|---|---|
| JP | 1-248479 | 10/1989 | | |
| JP | 4-171668 | 6/1992 | | |
| JP | 5-041241 | 2/1993 | | |
| JP | 11-238522 | * | 8/1999 | H01M 8/06 |
| JP | 11238522 A | * | 8/1999 | H01M 8/06 |

(Continued)

OTHER PUBLICATIONS

IPDL JPO machine translation of JP11238522A published on Aug. 31, 1999, retrieved on Oct. 9, 2008.*

(Continued)

*Primary Examiner* — Patrick Ryan
*Assistant Examiner* — Angela Martin
(74) *Attorney, Agent, or Firm* — Drinker Biddle & Reath LLP

(57) ABSTRACT

To an internal vessel that houses cells of a solid oxide fuel cell, an external vessel is further disposed. In the internal vessel, a plurality of planar cells is disposed vertically with a gap between the cells, a mixed gas of a fuel and air is descended from top down through the gap having a predetermined width between the cells, and, at a bottom portion of the housing space, the mixed gas is burned to generate electricity.

12 Claims, 6 Drawing Sheets

(56) References Cited

FOREIGN PATENT DOCUMENTS

| JP | 2002-83610 | 3/2002 | | |
|----|------------|--------|---|---|
| JP | 2003-92124 | 3/2003 | | |
| JP | 2003-132933 | 5/2003 | | |
| JP | 2003-187830 | 7/2003 | | |
| JP | 2003-297397 | * 10/2003 | ............. | H01M 8/04 |
| JP | 2004-139960 | 5/2004 | | |
| JP | 2004-199877 | 7/2004 | | |
| JP | 2005-276519 | 10/2005 | | |
| JP | 2006-086019 | * 3/2006 | ............. | H01M 8/04 |
| JP | 2006-253090 | 9/2006 | | |

OTHER PUBLICATIONS

Hibino, Takashi et al., "A Low-Operating-Temperature Solid Oxide Fuel Cell in Hydrocarbon-Air Mixtures" (2000), Science, vol. 288, pp. 2031-2033.

Hibino, Takashi et al., "High Performance Anodes for SOFCs Operating in Methane-Air Mixture at Reduced Temperatures" (2002), Journal of the Electrochemical Society, 149 (2), pp. A133-A136.

Shao, Zongping et al., "A thermally self-sustained micro solid-oxide fuel-cell stack with high power density" (Jun. 9, 2005) Nature, vol. 435, pp. 795-798.

* cited by examiner

SOLID OXIDE FUEL CELL

BACKGROUND OF THE INVENTION

The invention relates to a solid oxide fuel cell, in particular, a solid oxide fuel cell that is simple in a structure, can generate electricity at a high density, and is easy to handle.

As big problems of the modern world, an energy problem and an environmental problem can be cited. As one of technologies that contribute to overcome the problems, a fuel cell technology is expected and various studies are in progress to achieve higher efficiency and low cost thereof.

The fuel cells are categorized in four types depending on kinds of electrolytes that constitute a battery. That is, 1) a solid polymer type where an electrolyte is a polymer exchange membrane, 2) a phosphoric acid type where an electrolyte is phosphoric acid, 3) a molten carbonate type where an electrolyte is carbonate and 4) a solid oxide type where an electrolyte is a solid oxide can be cited.

The invention relates to the fourth type thereof, that is, a solid oxide fuel cell (hereinafter, in some cases, referred to as "SOFC (solid oxide fuel cell)").

SOFC

The SOFC uses for instance a ceramic solid oxide electrolyte. Since it can work at such a high temperature as substantially 1000° C., without employing an expensive catalyst such as Pt (platinum), the running cost can be lowered. Furthermore, since the working temperature is high, a temperature of an exhaust heat exhausted when electricity is generated is high as well. Accordingly, when the exhaust heat is used to operate a turbine generator, the power generation due to the SOFC and the turbine power generation can be combined to achieve power generation efficiency of substantially 70%. Since there is no need of externally supplying heat necessary for extracting hydrogen, high efficiency power generation can be realized. Accordingly, as the fuel, other than hydrogen, hydrocarbons in general such as city gas and biomass gas can be advantageously utilized as these are.

Furthermore, since the output density is higher than other batteries, a system can be downsized. In the SOFC, properties in that, when a solid electrolyte formed of ceramics (a stabilized zirconia compound such as YSZ (yttria-stabilized zirconia)) is exposed to a high temperature, an oxide ion can freely pass are utilized to generate electricity.

Cell

A configuration of a cell 2 of the solid oxide fuel cell is shown in FIG. 6. In the solid oxide fuel cell, a cathode electrode layer 23 (expressed by downward-sloping hatchings) is formed on one surface of an oblong planar solid oxide substrate 21, an anode electrode layer 22 (expressed by upward-sloping hatchings) is formed on an opposite surface thereof, and, with the solid oxide substrate 21, the cathode electrode layer 23 and the anode electrode layer 22, one solid oxide fuel battery cell 2 is constituted. On a side of the cathode electrode layer 23, oxygen or oxygen-containing gas is supplied, and, on a side of the anode electrode layer 22, a fuel gas such as methane is supplied. The cell 2 may be formed in circle or other shapes.

Principle of Power Generation

In the next place, the principle of power generation of the solid oxide fuel battery cell 2 will be described.

In the cell 2, oxygen ($O_2$) supplied to the cathode electrode layer 23 is ionized to oxygen ion ($O_2-$) at a boundary surface between the cathode electrode layer 23 and the solid oxide substrate 21 and the oxygen ion moves through the solid oxide substrate 21 to the anode electrode layer 22. At an anode electrode layer 22 interface, the oxygen ion reacts with gas (such as methane ($CH_4$) gas) supplied to the anode electrode layer 22 to generate water ($H_2O$), carbon dioxide ($CO_2$), hydrogen ($H_2$) and carbon monoxide (CO). In the reaction, an electron is released from the oxygen ion.

Here, when external lead wires L1 and L2 are attached to the cathode electrode layer 23 and the anode electrode layer 22, electrons flow from the anode electrode layer 22 through the lead wire to a side of a cathode layer 23 (that is, electricity flows from the cathode electrode layer 23 through the lead wire toward the anode electrode layer 22), thereby power generation can be realized.

Upon generating electricity, the oxygen ion moves inside of the solid oxide substrate 21 to reach the anode electrode layer 22. When a substrate temperature of the solid oxide is low, since the internal resistance becomes larger to be difficult for the oxygen ion to move and for a reaction to occur, the electricity is not generated. In this connection, in order to cause the reaction, the substrate temperature has to be elevated to a power generation temperature in the range of substantially 800 to 1000° C. Accordingly, a perimeter of a cell has to be heated or a fuel has to be burned (patent literature 1).

Constituent Materials of Cell

Subsequently, materials and configurations that constitute the solid oxide substrate 21, the anode electrode layer 22 and the cathode electrode layer 23, which constitute the cell 2, will be described.

In the solid oxide substrate 21, for instance, known materials shown below can be used.

a) YSZ (yttria-stabilized zirconia), ScSZ (scandium-stabilized zirconia) and zirconia-based ceramics obtained by doping Ce or Al thereto, b) ceria-based ceramics such as SDC (samaria-doped ceria) and GDC (gadolia-doped ceria) and c) LSGM (lanthanum gallate) and bismuth oxide-based ceramics Furthermore, in the anode electrode layer 22, for instance, known materials can be adopted and following materials can be used.

d) Thermet between nickel and yttria-stabilized zirconia, scandia-stabilized zirconia or ceria based (SDC, GDC and YDC) ceramics, e) sintered bodies with a conductive oxide as a main component (50% by weight or more and 99% by weight or less) (the conductive oxide expresses for instance lithium-dissolved nickel oxide) and f) ones obtained by compounding 1 to 10% by weight of a metal of platinum group elements or an oxide thereof to ones cited in d) and e) can be cited. Above all, d) and e) are particularly preferred.

The sintered bodies mainly made of a conductive oxide of e) have excellent oxidation resistance. Accordingly, such phenomena as the deterioration of the power generation efficiency or inability of power generation caused due to a rise in the electrode resistance of the anode electrode layer 22, which is caused due to an oxidation of the anode electrode layer 22 and peeling of the anode electrode layer 22 from the solid oxide substrate 21 can be inhibited from occurring. Furthermore, as the conductive oxide, lithium-dissolved nickel oxide is preferred. Still furthermore, when a metal made of a platinum group element or an oxide thereof is compounded to ones cited in d) or e), high power generation performance can be obtained.

For the cathode electrode layer 23, known materials can be adopted. For instance, manganese oxide compounds (for instance, lanthanum strontium manganite), gallium oxide compounds or cobalt oxide compounds (for instance, lanthanum strontium cobaltite) of the third group element of the periodic table such as lanthanum to which strontium (Sr) is added can be cited.

The cathode electrode layer 23 and the anode electrode layer 22 both are formed in a porous body. In the electrode layers, the open pore rate of the porous body is set at 20% or more, preferably in the range of 30 to 70% and particularly preferably in the range of 40 to 50%. In the solid oxide fuel cell used in the example, it is necessary that the cathode electrode layer 23 and the anode electrode layer 22, which are formed into a porous body, are arranged vertically, and a mixed gas G can go through from a top end thereof toward a bottom end to be supplied over an entire surface of the respective electrode layers.

Producing Method of Battery Cell

In the next place, a producing process of the solid oxide fuel battery cell 2 will be described.

The solid oxide fuel battery cell 2 is produced as shown below.

As the solid oxide substrate 21, a mixture containing samarium-doped ceria ($Ce_{0.8}Sm_{0.2}O_{1.9}$, hereinafter, referred to as SDC) powder, polyvinyl butyral and dibutyl phthalate is slurried by use of a well known ball mill method, followed by preparing a green sheet having a thickness of substantially 0.2 mm, further followed by punching in a definite shape, still further followed by sintering at 1300° C. in air, and thereby a solid oxide substrate 21 is prepared.

On one surface side of thus obtained solid oxide substrate 21, a paste of a mixture of 50% by weight of samarium/strontium/cobaltite (SSC) and SDC, which becomes the cathode electrode layer 23, is printed. On the other surface thereof, a paste of a mixture of NiO:CoO:SDC at a weight ratio of 50:10:40, which becomes the anode electrode layer 22, is printed. In the sintered body, a platinum mesh (#80) thereto a platinum wire is welded is embedded, followed by sintering at 1200° C. in air to use in the invention, and thereby one sheet of solid oxide fuel battery cell 2 can be produced.

Meshed Metal

Furthermore, as a method of improving the endurance of the solid oxide fuel battery cell 2, a method where a meshed metal is buried in or fastened to the cathode electrode layer 23 and the anode electrode layer 22 is well known.

As a method of burying the meshed metal, there is a method where each of materials (pastes) of the respective layers is coated on the solid oxide substrate 21, followed by burying a meshed metal in the coated material, further followed by sintering. A method of fastening is not to completely bury a meshed metal with a material of each of the layers but to adhere thereto to sinter.

As the meshed metal, ones excellent in harmony with the thermal expansion coefficients of the cathode electrode layer 23 and the anode electrode layer 22 in which or to which the meshed metal is buried or fastened and in the heat resistance are preferred. Specifically, ones obtained by forming a metal made of platinum or an alloy containing platinum into a mesh can be cited.

Furthermore, in place of the meshed metal, a wire-like metal may be buried in or fastened to the cathode electrode layer 23 and the anode electrode layer 22. The wire-like metal is made of a metal same as that of the meshed metal and is not restricted in the number and disposition shape. When the meshed metal or wire-like metal is buried in or fastened to the anode electrode layer 22 and the cathode electrode layer 23, the solid oxide substrate 21 cracked due to the thermal hysteresis can be reinforced so that the solid oxide substrate 21 may not be collapsed in splinters.

The meshed metal or wire-like metal may be buried in either or both of the anode electrode layer 22 and the cathode electrode layer 23. Furthermore, the meshed metal and the wire-like metal may be disposed in combination. In the case of cracks being generated owing to the thermal hysteresis, when the meshed metal or the wire-like metal is buried at least in the anode electrode layer 22, without deteriorating the power generation capability, the power generation can be continued. The power generation capacity of the solid oxide fuel battery cell 2 largely depends on an effective area as a fuel electrode of the anode electrode layer 22; accordingly, the meshed metal or wire-like metal may be disposed at least to the anode electrode layer 22.

Separate Type and Single Chamber Type

Known fuel cells can be divided, from the viewpoint of a gas supply system, into a separate type where an oxygen gas and a fuel gas are supplied through separate paths (patent literatures 2 and 3) and a single chamber type where an oxygen gas and a fuel gas are mixed in advance and supplied (patent literatures 3, 4 and 5 and non-patent literatures 1 and 2). The invention relates to a fuel cell according to the latter type.

In the single chamber type fuel cell, on opposite surfaces of a solid oxide substrate, a cathode electrode layer and an anode electrode layer are disposed to form a fuel battery cell. The fuel battery cell is disposed in a mixed gas G where a fuel gas (such as methane gas) and an oxygen gas are mixed to generate an electromotive force between the cathode electrode layer and the anode electrode layer. Since an entire fuel battery cell can be set in a substantially same atmosphere, a fuel cell can be formed in a single chamber, and thereby the endurance of the fuel battery cell can be improved.

[Patent literature 1] JP-A 2003-297397
[Patent literature 2] JP-A 2005-276519
[Patent literature 3] JP-A 2002-083610
[Patent literature 4] JP-A 2004-199877
[Patent literature 5] JP-A 2003-92124
[Non-patent literature 1] Science, Vol. 288 (2000), p 2031 to 2033
[Non-patent literature 2] Journal of The Electrochemical Society, 149 (2) A133 to A136 (2002)

In existing technologies, even in the single chamber type, a plurality of cells produced according to the foregoing method is directly laminated (or laminated superposed through a separator made of ceramics such as lanthanum chromite or a heat-resistant metal such as SUS based alloy) to form a fuel cell (patent application No. 2005-071645). In a battery having such a configuration, a fuel/air mixed gas G flows through an anode electrode layer and a cathode electrode layer, which are porous bodies; accordingly, the flow resistance becomes large, a width of a speed distribution of the gas flow is large, that is, the gas G does not flow uniformly. Accordingly, the diffusion velocity of the gas G is slow, a chemical reaction is difficult to occur, an internal diffusion overvoltage becomes larger, and thereby the power generation output is small.

Furthermore, reactions in the electrode proceed at interfaces of three phases of the anode electrode layer, the solid oxide substrate and the cathode electrode layer, which are bonded due to the sintering. In the existing technologies, since the anode electrode layer and the cathode electrode layer are laminated, there are irregularities in the flatness of a cell surface and the surface roughness of the electrode. Accordingly, the anode electrode layer and the cathode electrode layer, when coming into contact directly with each other, solely work as an electrical connection point; accordingly, power generation output that can be extracted from the chemical reaction becomes small.

Furthermore, in the existing single chamber type fuel cell, in order to avoid a gas explosion, a gas concentration is managed so as to be in a combustion concentration range. The gas G can be burned within a predetermined concentration range but cannot be burned outside of the range. The predetermined range is called a combustion concentration range. Such a management is very expensive and very dangerous.

As mentioned above, in the existing technology, there are problems in that the power generation output that can be extracted is small and the gas management has to be sufficiently applied.

SUMMARY OF THE INVENTION

The invention intends to form a fuel cell into a simple structure and to stably heighten the power generation output.

In the invention, a structure where electrodes of same kind are disposed faced to each other is adopted, a gap is disposed between both electrodes with the gas set within a predetermined range, a configuration where heat is contained is adopted, and thereby the power generation output is heightened.

According to a first aspect of the invention, there is provided a single chamber solid oxide fuel cell, including:
  a cell housing in which a mixed gas of a fuel and air is flowed, and
  a plurality of planar cells disposed, in the cell housing space of the cell housing, in parallel and with a predetermined gap between the cells, wherein
  the mixed gas flows the gap and is burned at a downstream portion of a flow of the mixed gas in the housing space to generate electricity.

According to a second aspect of the invention, there is provided the single chamber solid oxide fuel cell according to the first aspect, wherein
  the plurality of cells is disposed with electrodes of same kind faced to each other.

According to a third aspect of the invention, there is provided the single chamber solid oxide fuel cell according to the first or second aspect, wherein
  the gap between the cells is equal to or less than a quenching distance to the mixed gas.

According to a fourth aspect of the invention, there is provided the single chamber solid oxide fuel cell according to any one of the first to third aspects, further including:
  an internal vessel that houses the cells and is made of a heat-insulating material; and
  an external vessel that houses the internal vessel and is made of a heat-insulating material; wherein
  a gap is disposed between the internal and external vessels to exhaust an exhaust gas.

According to a fifth aspect of the invention, there is provided the single chamber solid oxide fuel cell according to the fourth aspect, wherein
  on an inner wall of the internal vessel housing the cells, a highly conductive material layer is formed.

According to a sixth aspect of the invention, there is provided the single chamber solid oxide fuel cell according to any one of the first to fifth aspects, wherein
  the plurality of cells is electrically connected between electrodes of different kind of adjacent cells to form a series connection as a whole.

According to a seventh aspect of the invention, there is provided the single chamber solid oxide fuel cell according to any one of the first to fifth aspects, wherein
  the plurality of cells is electrically connected between electrodes of same kind of adjacent cells to form a parallel connection as a whole.

According to an eighth aspect of the invention, there is provided the single chamber solid oxide fuel cell according to any one of the first to fifth aspects, wherein
  groups of electrical connection between electrodes of same kind of adjacent cells are connected in series.

According to a ninth aspect of the invention, there is provided the single chamber solid oxide fuel cell according to any one of the first to fifth aspects, wherein
  groups of electrical connection between electrodes of different kind of adjacent cells are connected in parallel.

Like a configuration of the invention, when in a fuel cell a plurality of cells is disposed faced to each other with a gap, in comparison with an existing battery, a very high power generation efficiency can be obtained. Furthermore, since a battery of the invention is very simple in the structure, can very rapidly generate electricity and is formed in a single chamber type, oxygen partial pressure at an anode electrode layer is high and a fuel is decomposed to CO and H; accordingly, there is no need of a device for fuel modification. Still furthermore, a fuel cell can be rapidly started up.

DETAILED DESCRIPTION OF THE PREFERRED EMBODIMENTS

In what follows, examples of the invention will be described.

Figure 1:
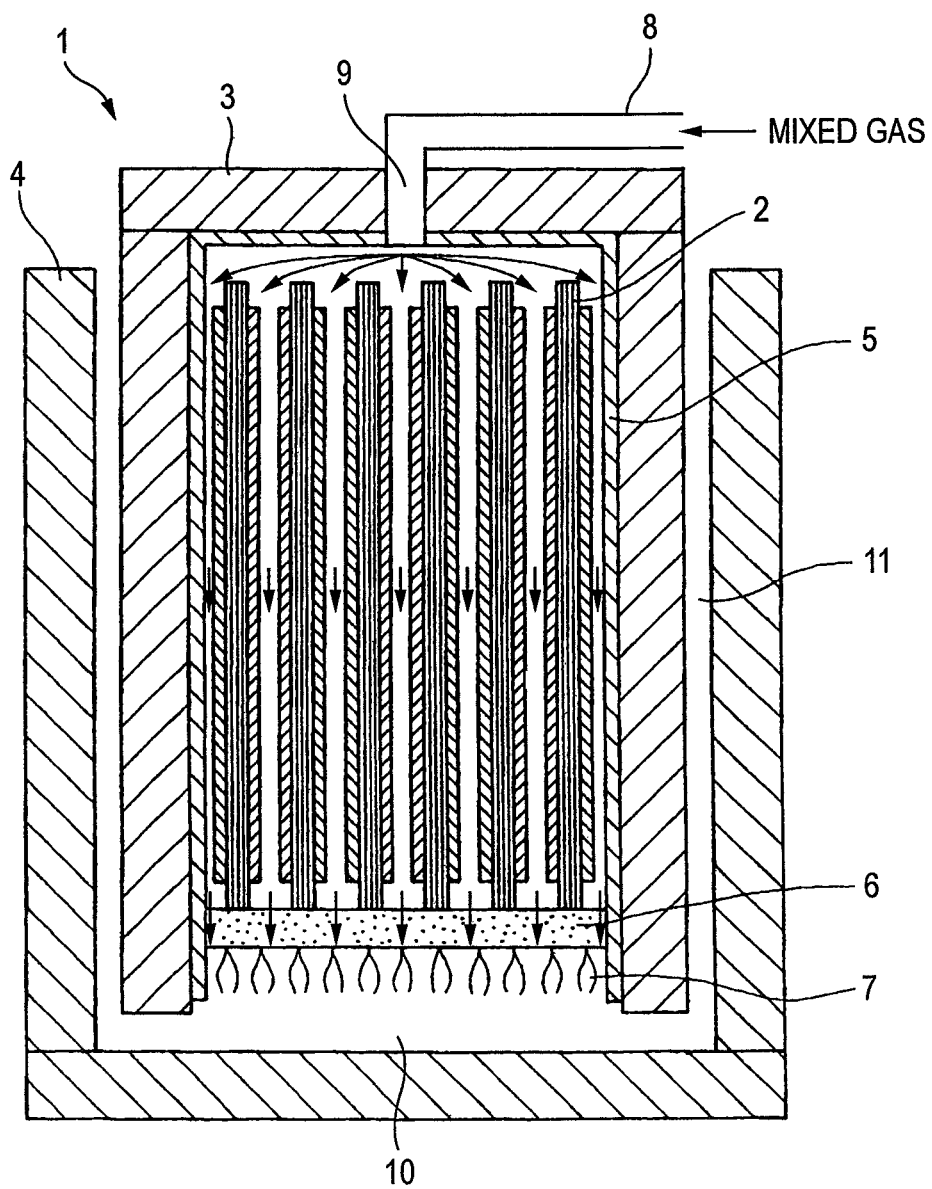
FIG. 1 is a sectional view cut along an axis going through a center of a fuel cell of the invention.

FIG. 1 is a sectional view of a solid oxide fuel cell of the invention. In the drawing, reference numerals 1 through 11, respectively, express a solid oxide fuel cell, a battery cell, an internal vessel, an external vessel, a highly conductive material layer, a porous body, a flame, an introduction pipe of a mixture gas of fuel and air, an inlet port, a bottom space formed by the porous body 6 and the external vessel 4 and a space between side surfaces formed from the internal vessel 3 and the external vessel 4.

In FIG. 1, the external vessel 4 and the internal vessel 3 of the fuel cell 1 is made of a heat-insulating material and between both the space 11 therefrom burnt exhaust gas is exhausted is disposed. Inside of the internal vessel 3, a plurality of oblong planar cells 2 is disposed and the porous body 6 that supports bottom portions of the plurality of cells 2 and allows a mixture gas G described below to go through is disposed. In the drawing, the number of the cells 2 is set at 6 sheets. However, this is only an example. The number of the cells 2 is determined considering a size of the vessel and a magnitude of the output that is extracted.

At an upper portion of the internal vessel 3, the inlet port 9 is disposed and the mixed gas G (gas G obtained by mixing fuel F and air A) is introduced from the introduction pipe 8 inside of the vessel. The inside of the vessel 3 is sealed with a heat-insulating material except for the inlet port 9. On an inner wall of the internal vessel 3, the highly conductive material layer 5 is disposed. This is disposed in order that the inside of the vessel may be rapidly soaked (homogenization of temperature distribution) to rapidly start up the fuel cell and thereby to inhibit the vessel from being broken owing to the irregularity of the inside temperature. As the highly conductive material, metal such as copper and a copper alloy and ceramics such as aluminum nitride are preferred. As the fuel, for instance, town gas, methane and propane can be used. However, the fuel is not restricted thereto.

The porous body 6 is disposed at a bottom portion of the internal vessel 3, allows a descending mixed gas G to go through, partitions a space that houses the cells 2 and the bottom space 10 and supports the cells 2. The mixed gas G is burned in the bottom space 10 and a flame of the combustion is shown by reference numeral 7. The porous body 6 is made of for instance alumina.

Flow of Mixed Gas, Gap between Cells and Fluidity of Gas

The mixed gas of fuel F and air A is flowed in the internal vessel 3 from the introduction pipe 8 of the gas G, goes past between the plurality of cells, reaches the porous body 6 downstream of the gas flow, goes past the porous body 6 and reaches the bottom space 10 of the internal vessel 3. In the bottom space 10, by use of a not shown burner, the gas G is burnt. An exhaust gas is exhausted through a space 11 between side surfaces of the internal vessel 3 and the external vessel 4.

The plurality of cells 2 is arranged vertically and in parallel in the internal vessel 3 with a gap disposed between adjacent cells so that the mixed gas G may go through. The gap distance is set at so-called quenching distance of the mixed gas G or less. At the gap, a flame is neither generated nor propagated. Accordingly, when the gap distance is set at the quenching distance or less, the flame can be extinguished. Accordingly, with a simple configuration, the gas explosion can be inhibited.

The quenching distance is different depending on a fuel composition, a magnitude of the cell 2 and a peripheral temperature of the cell 2. Accordingly, the cell gap is determined taking these factors (fuel composition, magnitude of the cell 2 and peripheral temperature to be set) into consideration.

As mentioned above, the flow of the mixed gas G is in parallel with a plane direction of a plurality of planar cells 2. When the mixed gas G is flowed thus through the gap, in comparison with an existing cell laminate battery, the fluidity of the gas G becomes higher, and thereby the speed distribution of the gas G as well is made even. Accordingly, an environment where a chemical reaction is likely to occur is formed.

An experiment that is carried out to verify this will be shown.

Configuration of Cell for Experiment

On one surface of a disc of samarium-doped ceria (SDC) ceramics sintered in advance and having a thickness of substantially 0.2 mm (solid oxide substrate), a paste that is made of 75% by weight of NiO-5% by weight of rhodium oxide-38% by weight of SDC, to which 8% by mole of Li (lithium) is doped, and becomes an anode electrode layer is printed, on the other surface a paste that is made of 50% by weight of samarium/strontium cobaltite (SSC)-50% by weight of SDC and becomes a cathode electrode layer is printed, a platinum mesh with a platinum lead is buried in each of the printed layers, followed by drying, further followed by sintering at 1200° C. in air, and thereby a plurality of cells having an electrode area of substantially 1 cm$^2$ is prepared.

Experimental Conditions

In an alumina tube around which a heat-insulating material made of inorganic fiber fabric is wound, the plurality of cells 2 is disposed so that anodes may face each other with a gap of substantially 1 mm, a mixed gas of butane-air is passed through the alumina porous body, and thereby in a bottom space portion of the internal vessel a flame is formed.

Experimental Results

Under the above conditions, the output density is substantially 120 mW/cm$^2$. On the other hand, similar cells are stacked and disposed so that an anode and a cathode may face and evaluated with the same gas composition. In this case, the output largely fluctuated depending on a superposition state from several μW to 5 mW/cm$^2$.

Thus, according to the configuration of the invention, the power generation output of substantially 20 times that of the existing laminate type battery could be obtained.

Combustion of Mixed Gas

In order to operate a fuel cell, through the introduction tube 8, a space between the cell 2 and cell 2 and the porous body 6, the gas G is supplied to the bottom space 10, the gas G is burned by use of a burner (not shown in the drawing), and thereby a flame is generated. With the flame, a group of solid oxide fuel cells is heated to a temperature capable of generating electricity.

An exhaust gas is exhausted from a space 11 between the vessels. Since the internal vessel 3 and external vessel 4 are disposed and a high temperature exhaust gas is allowed going through between both vessels, both vessels can capture heat and the heat of the exhaust gas as well heats the battery; accordingly, very high thermal efficiency can be obtained.

Since the internal vessel and external vessel are combined thus, different from a configuration shown in FIG. 1 where a plurality of cells 2 is vertically disposed and the mixed gas G is flowed in a up and down direction, a horizontal configuration obtained by rotating this by 90° can be used.

Opposite Disposition of Electrodes of Same Kind

The cells 2 that are arranged in the internal vessel 3 are disposed with electrodes of same kind faced to each other. It is found by the inventors that, from a battery made of cells thus disposed, a very high power generation output could be obtained.

Electrical Connection in Opposite Disposition of Electrodes of Same Kind

An electrical connection of cells disposed with electrodes of same kind faced to each other like this will be described.

Figure 2:
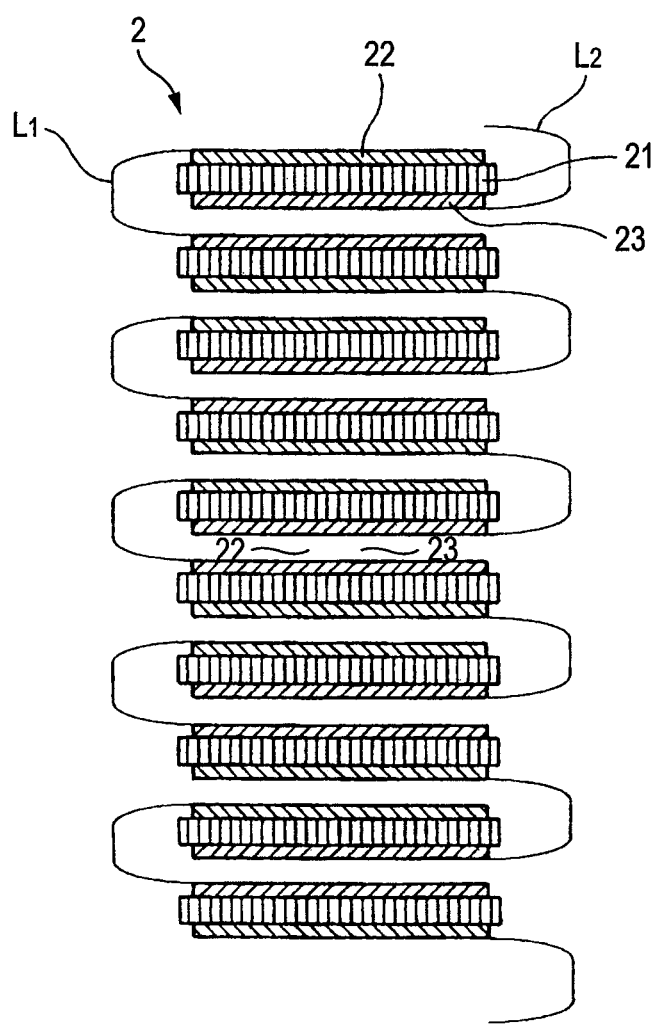
FIG. 2 is a diagram showing a series connection of cells.
Figure 3:
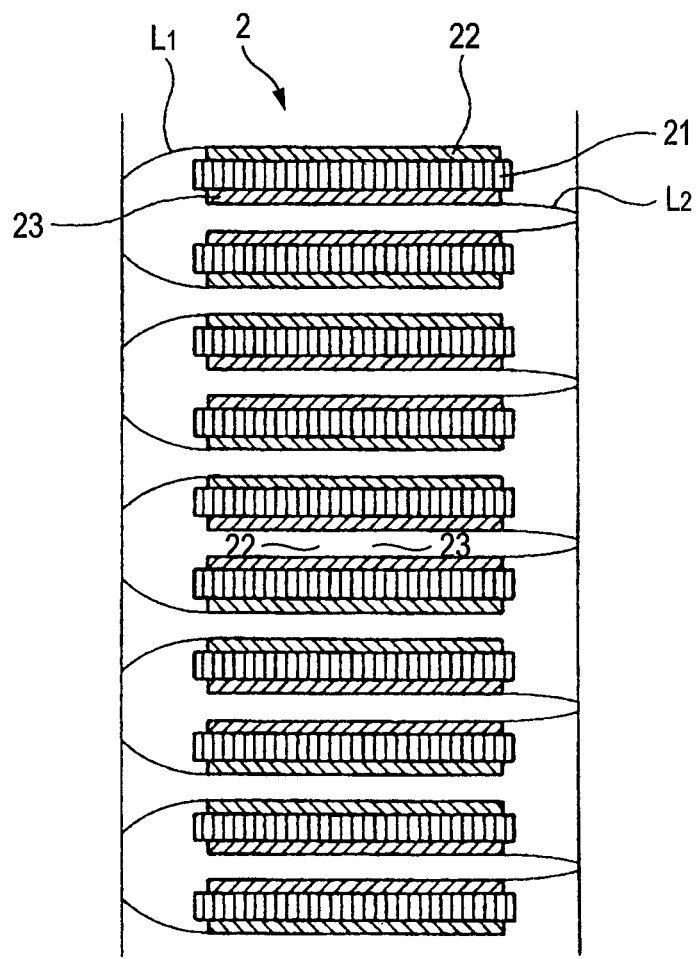
FIG. 3 is a first diagram showing a parallel connection.
Figure 4:
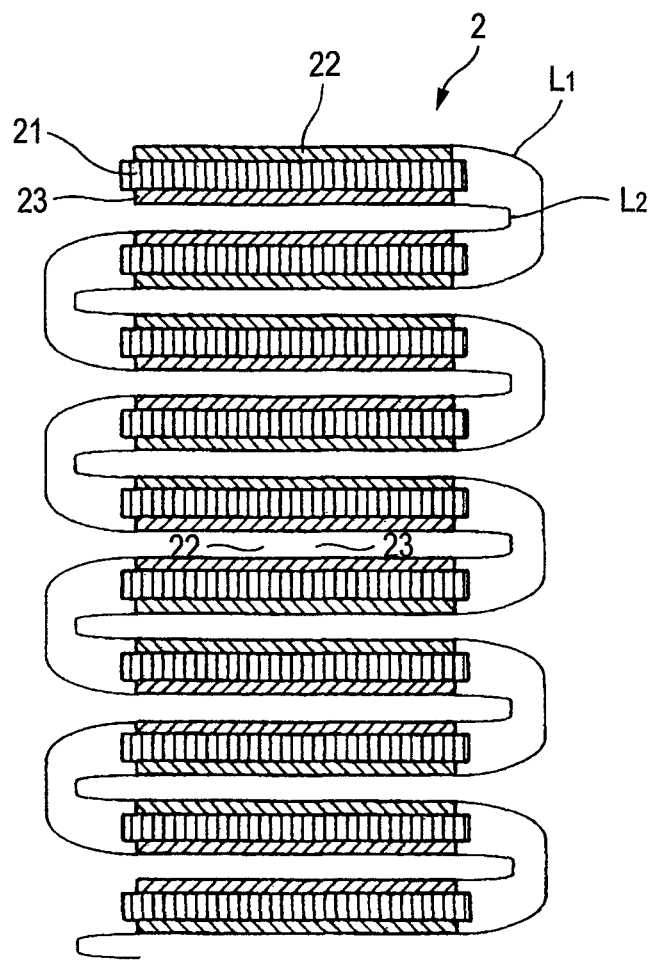
FIG. 4 is a second diagram showing a parallel connection.
Figure 5:
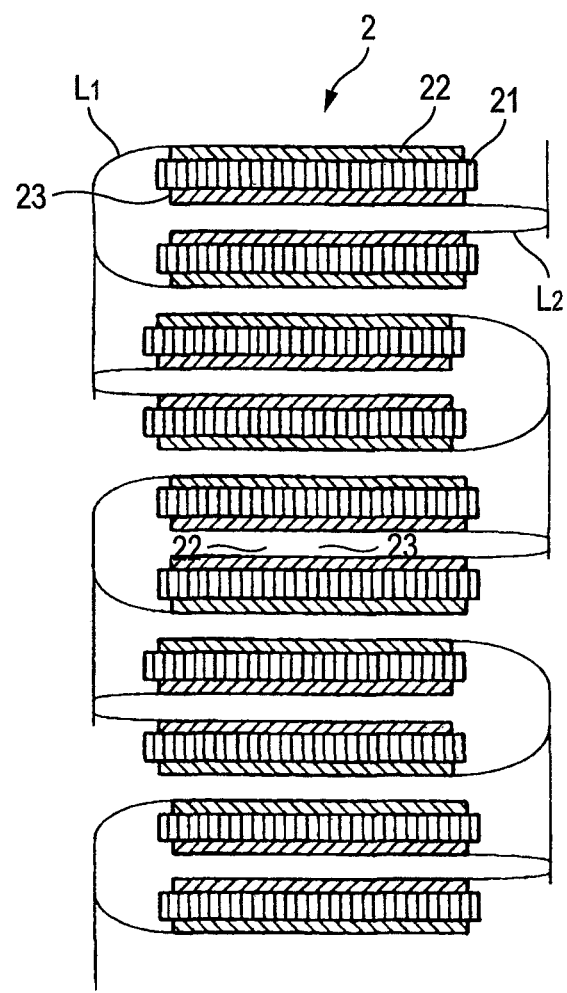
FIG. 5 is a diagram showing a series connection of groups of cells in parallel connection.
Figure 6:
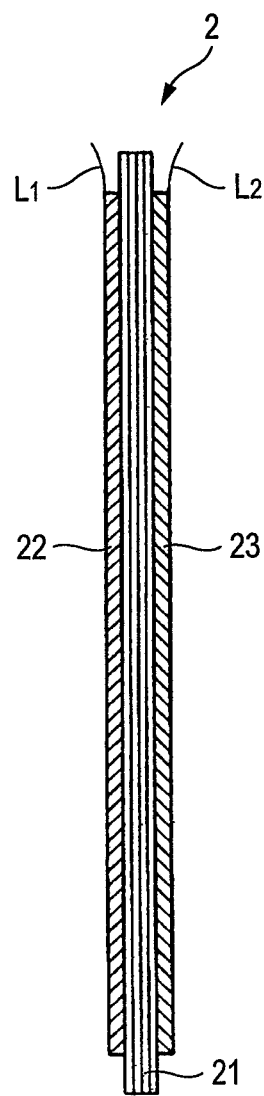
FIG. 6 is a diagram showing a structure of one cell of a solid oxide fuel cell.

Between a cell 2 and a cell 2, extension portions of the metal meshes are used to connect. Each of FIGS. 2 to 5 is a diagram showing a disposition of cells 2 and a connection structure thereof, which are seen from an influx direction of the mixed gas G. As examples, four examples are cited without restricting thereto. In FIG. 2, the respective cells 2 are connected in series. In FIGS. 3 and 4, the respective cells are connected in parallel. In FIG. 5, groups connected in parallel are connected in series. In the drawing, rising hatched lines show an anode and falling hatched lines show a cathode. With the rising hatched lines as a cathode and falling hatched lines as an anode, the cells 2 may be electrically connected each other.

As described above, according to the configuration of the invention, with a simple configuration, high power generation output can be obtained and a safe fuel cell can be produced.

What is claimed is:
1. A single chamber solid oxide fuel cell, comprising:
 a cell housing in which a mixed gas of fuel and air is flowed,
 a plurality of planar cells disposed in the cell housing space of the cell housing in parallel and with a predetermined gap between the cells,
 a porous body disposed in the cell housing space supporting the plurality of planar cells, the porous body parti- tioning the cell housing space into a first cell housing space and a second cell housing space, and the cell housing comprising an internal vessel that houses the cells and is made of a heat-insulating material and an external vessel that houses the internal vessel and is made of a heat-insulating material, wherein a gap is defined between an outer surface of the internal vessel and an inner surface of the external vessel, the gap extending parallel to the cells in a direction from the second cell housing space to the first cell housing space and defining an exhaust port at an end of the gap to exhaust an exhaust gas, the solid oxide fuel cell being configured such that in operation, the mixed gas flows the gap between the cells through the first cell housing space, flows through the porous body, and is burned at a downstream portion of a flow of the mixed gas in the second cell housing space to generate electricity, and after the mixed gas is burned in the second cell housing space, the exhaust gas flows through the gap between the outer surface of the internal vessel and the inner surface of the external vessel and is exhausted out of the exhaust port at the end of the gap.

2. The single chamber solid oxide fuel cell according to claim 1, wherein the plurality of cells is disposed with electrodes of same kind faced to each other.

3. The single chamber solid oxide fuel cell according to claim 1, wherein the gap between the cells is equal to or less than a quenching distance to the mixed gas.

4. The single chamber solid oxide fuel cell according to claim 1, wherein on an inner wall of the internal vessel housing the cells, a highly conductive material layer is formed.

5. The single chamber solid oxide fuel cell according to claim 1, wherein the plurality of cells is electrically connected between electrodes of different kind of adjacent cells to form a series connection of cells as a whole.

6. The single chamber solid oxide fuel cell according to claim 1, wherein the plurality of cells is electrically connected between electrodes of same kind of adjacent cells to form a parallel connection of cells as a whole.

7. The single chamber solid oxide fuel cell according to claim 1, wherein groups of electrical connection between electrodes of same kind of adjacent cells are connected in series.

8. The single chamber solid oxide fuel cell according to claim 1, wherein groups of electrical connection between electrodes of different kind of adjacent cells are connected in parallel.

9. A solid oxide fuel cell comprising:
a porous body;
a plurality of planer cells disposed on the porous body and arranged in parallel to each other with a gap interposed therebetween, each of the planer cells comprising:
a solid oxide substrate comprising a first surface and a second surface opposite to the first surface;
a anode electrode layer on the first surface of the solid oxide substrate; and
a cathode electrode layer on the second surface of the solid oxide substrate,
wherein each of the planer cells are electrically connected in series;
an internal vessel housing the porous body and the planer cells therein and having a supply port through which a mixed gas of a fuel and an air is inserted; and
an external vessel housing the internal vessel therein, wherein a space is defined between the internal vessel and the external vessel, the space being configured to exhaust the mixed gas from the internal vessel into the space and then directly to an outside through the space,
wherein the fuel cell is configured to generate electricity by supplying the mixed gas to the respective cells and burning the mixed gas through the porous body.

10. The solid oxide fuel cell of claim 9, wherein each of the planer cells is disposed on the porous body to be in contact with the porous body.

11. The solid oxide fuel cell of claim 10, wherein the anode electrode layer of one of the planer cells faces the cathode electrode layer of a planar cell adjacent to said one of the planer cells in a direction perpendicular to a surface of the porous body on which the planer cells are disposed.

12. The solid oxide fuel cell of claim 9, wherein the respective cells are electrically connected in series by a lead wire.

* * * * *